(12) United States Patent
Matsubara

(10) Patent No.: US 11,609,364 B2
(45) Date of Patent: Mar. 21, 2023

(54) OPTICAL LAMINATED SHEET

(71) Applicant: SUNTECHOPT CO., LTD., Osaka (JP)

(72) Inventor: Yuki Matsubara, Osaka (JP)

(73) Assignee: SUNTECHOPT CO., LTD., Osaka (JP)

(*) Notice: Subject to any disclaimer, the term of this patent is extended or adjusted under 35 U.S.C. 154(b) by 654 days.

(21) Appl. No.: 16/499,380

(22) PCT Filed: Apr. 1, 2017

(86) PCT No.: PCT/JP2017/013867
§ 371 (c)(1),
(2) Date: Jan. 4, 2020

(87) PCT Pub. No.: WO2018/179450
PCT Pub. Date: Oct. 4, 2018

(65) Prior Publication Data
US 2020/0386921 A1    Dec. 10, 2020

(51) Int. Cl.
*G02B 5/04*    (2006.01)
*G02B 5/02*    (2006.01)
(Continued)

(52) U.S. Cl.
CPC .............. *G02B 5/04* (2013.01); *B32B 3/30* (2013.01); *B32B 7/02* (2013.01); *G02B 5/02* (2013.01)

(58) Field of Classification Search
CPC . G02B 5/02; G02B 5/04; G02B 5/045; G02B 5/0226; G02B 5/0278;
(Continued)

(56) References Cited

U.S. PATENT DOCUMENTS

| 6,846,089 B2* | 1/2005 | Stevenson ............ G02B 6/0053 362/23.15 |
| 2004/0228106 A1 | 11/2004 | Stevenson et al. |
| 2007/0297062 A1* | 12/2007 | Park ..................... G02B 5/0226 359/619 |

FOREIGN PATENT DOCUMENTS

| JP | 2007-502010 A | 2/2007 |
| JP | 2009-123397 A | 6/2009 |

(Continued)

OTHER PUBLICATIONS

"International Search Report", PCT/JP2017/013867, dated Jun. 27, 2017, 2 pages.

*Primary Examiner* — Jie Lei
(74) *Attorney, Agent, or Firm* — Ogilvie Law Firm

(57) ABSTRACT

The present invention provides a thin optical laminated sheet with little or no interference fringes or rainbow-like colors, and a method of manufacturing the optical laminated sheet. An optical laminated sheet is integrally formed by laminating a plurality of optical films having an adhesive layer interposed therebetween, the optical laminated sheet including an adhesive layer A wherein one surface is a flat and smooth surface and the opposite surface has an unevenness shaped by a transfer. The optical laminated sheet may include an integrally formed laminate wherein one surface of the adhesive layer A is planarly bonded to one surface of the optical film and an uneven surface that is the other surface of the adhesive layer A is linearly and/or intermittently bonded to the prism edges of a light collecting film made up of prism rows. The optical laminated sheet may be used in a backlight unit.

6 Claims, 4 Drawing Sheets

(51) Int. Cl.
*B32B 7/02* (2019.01)
*B32B 3/30* (2006.01)

(58) Field of Classification Search
CPC .. G02B 5/0221; G02B 5/0268; G02B 6/0053; G02B 6/0065; G02B 3/0043; G02B 3/005; G02B 3/0056; G02B 3/0068; G02F 1/1335; G02F 1/133606; G02F 1/133607; G02F 1/133526; B32B 3/30; B32B 7/02; B32B 7/022
USPC ..... 359/207.8, 599, 609, 615, 619, 621, 625
See application file for complete search history.

(56) References Cited

FOREIGN PATENT DOCUMENTS

| | | | |
|---|---|---|---|
| JP | 2010-176133 | A | 8/2010 |
| JP | 2011-069944 | A | 4/2011 |
| JP | 2012-203233 | A | 10/2012 |
| JP | 2015-524088 | A | 8/2015 |
| WO | 2016/088385 | A1 | 6/2016 |

* cited by examiner (1)

(2)

OPTICAL LAMINATED SHEET

TECHNICAL FIELD

The present invention relates to a laminated optical sheet, and more specifically, to a laminated optical sheet that is reduced in thickness and also in generation of interference fringes and rainbow-like colors.

BACKGROUND ART

LCD panels such as mobile phones, electronic dictionaries, tablet PCs, smart phones, car navigation systems, televisions and so on are widely used as display devices. Since the LCD panel does not emit light by itself, a backlight unit is required on the back of the panel.

As shown in FIG. 1, the backlight unit 2 is configured by laminating a reflection plate 4, a light guide plate 5, a light diffusion film 6 and a light collection film 7. In the LCD panel 1, a light diffusion film 6, a liquid crystal cell 8, a polarizing film 10 and an antireflection film 9 are further laminated on a light collection film 7. An LED 3 is installed at the end face of the light guide plate as a light source.

Light generated from the LED enters from the end surface of the light guide plate 5 and exits from the front surface of the light guide plate 5. A diffusion film 6 is disposed on the front surface of the light guide plate 5, and the emitted light is transmitted through the diffusion film 6 and diffused. On the upper surface of the diffusion film 6, a condensing film 7 composed with prism rows is arranged. The light incident from the lower surface of the condensing film 7 is emitted from a surface which includes the ridgeline (crest side) of the prism row. A condensing film 7 made of a prism row is disposed on the upper surface of the condensing film 7 to further improve luminance. The light emitted from the condensing film 7 is incident on the lower surface of the liquid crystal cell 8 and illuminates.

In some cases, a diffusion film 6 may be installed between the condensing film 7 and the liquid crystal cell 8.

In accordance with the recent thinning of products using LCD panels, there are demands for thinner backlight units and improved brightness, as well as ease of handling and cost reduction. The thinning of the entire product incorporating the LCD panel requires higher optical efficiency of the backlight unit, namely improvement of brightness, in order to reduce power consumption under the reduced battery installation volume condition. In order to improve the brightness, a plurality of condensing films composed with prism rows is used. In order to further improve the luminance, a plurality of condensing films is used in an overlapping manner.

As shown in FIG. 2, the condensing film 50 composed with has a prism row composed with a molding layer including the prism row and its support layer.

While superimposing condensing films of prism rows increases the brightness, it also increases the total thickness of the backlight unit, and further increases the number of steps for assembling the liquid crystal unit, resulting in more chances of damaging the condensing film.

Thereupon, a light-collecting film composed with two prism rows that are structural members of a backlight unit being integrated through an adhesive layer is known (for example, refer to Patent literature 1). This reduces the number of steps required for assembling the liquid crystal unit and reduces the possibility of damage to the light collecting film formed with the prism rows.

The condensing film composed with prism rows generally has a triangular cross-sectional shape of the prism rows, and the apex angle of the triangular shape is approximately 90°. By laminating condensing films composed with two prism rows via an adhesive layer, the top of the said prism rows is prevented from being damaged during the assembly of the liquid crystal unit, which otherwise lowers the effect of improving the brightness.

However, there has been a problem that when the condensing film with two prism rows is bonded, the top of the prism row of the condensing film with the lower prism row is bonded to the adhesive layer and deformed, resulting in decrease of the length of the inclined surface in the vicinity of the top of the prism row, which substantially reduces the area by which the light incident from the lower surface is refracted and condensed, reducing the brightness enhancement effect.

Accordingly, in order to reduce the loss of the inclined plane region near the mountain top, namely the light collection area near the mountain top of the prism row of the condensing film with a prism row, a laminated optical sheet having an adjusted inclined plane has been proposed (refer to Patent literature 2).

It is intended that, by forming the triangular inclined surface length of the prism row of the condensing film including the prism row located from the light guide plate toward the upper liquid crystal cell longer than the triangular inclined surface length of the prism row including the prism row arranged thereupon, the decrease in the inclined area near the top of the prism row at the time of bonding can be mitigated, thus suppressing the decrease in luminance.

An increase of the length of the inclined surface causes an increase in the thickness of the condensing film composed with the prism rows, and therefore there is a problem that it cannot cope with a demand for reduction in thickness. When a plurality of optical films is laminated for the purpose of improving brightness, not only the problem of increase in thickness but also interference fringes and rainbow-like colors may occur (rainbow-like colors may also be described as "iris-like"). When the condensing films composed with two prism rows overlap, generation of interference fringes and rainbow-like color becomes a problem.

Accordingly, it has been proposed to form a resin layer having fine irregularities on the bottom surface of a light-collecting film composed with prism rows (for example, refer to Patent literature 3). In this method, unevenness is formed on the bottom surface side of the prism portion by furnishing a light transmission diffusion layer on the bottom surface of the prism portion or performing a mat treatment on the bottom surface of the prism portion. The uneven surface diffuses the incident light and prevents the occurrence of interference fringes and rainbow-like colors. The light transmission diffusion layer is formed by a resin coating in which fine particles such as acrylic beads and silica beads are uniformly dispersed in a transparent material such as polystyrene or polyester by roll coating or the like. The fine particles form protrusions on the surface to obtain an uneven surface.

The light transmission diffusion layer having an uneven surface causes an increase in the thickness of the laminated optical sheet.

Furthermore, since the light transmission diffusion layer contains fine particles, it hinders cost reduction. In addition, the fine particles may fall off and damage the prism portion or such. It is also possible to provide a light transmission diffusion layer by forming irregularities directly on the bottom surface of the prism portion. Examples of the method for forming irregularities include embossing and sandblasting. The method of providing the light transmission diffusion effect by forming an uneven portion on the bottom surface of the prism portion has a problem that the process becomes complicated.

PRIOR ART

Patent Literature

[Patent literature 1] JP 2007-502010 A
[Patent literature 2] JP 2015-524088 A
[Patent literature 3] JP 2011-69944 A

OUTLINE OF THE INVENTION

Problems to be Solved by the Invention

In view of the situation mentioned above, the first object of the present invention is to present a laminated optical sheet that is reduced in thickness without occurrence of interference fringes and rainbow-like colors in a laminated body in which a light collecting film composed with a plurality of prism rows is laminated and integrated, and further a manufacturing method thereof.

The second object of the present invention is to provide a backlight unit made of a laminated and integrated optical sheet including a diffusion film that suppresses the generation of interference fringes and rainbow-like colors.

Means to Solve the Objects

A laminated optical sheet of the present invention is a laminated optical sheet in which a plurality of optical films are stacked and integrated with an adhesive layer interposed therebetween, and one surface is a smooth surface and the opposite surface is a rough surface which includes an adhesion layer A having spherical convex portions whose rough surface is shaped by transferring.

Note that one surface (interface) of the adhesive layers adhered to the adherend is a smooth surface, with the adhesive surface being the opposite surface composed with spherical convex portions shaped by transfer, which is referred to as an adhesive layer A.

In a laminated optical sheet according to an Embodiment, roughness Ra of the rough surface of the adhesive layer A is 0.01 to 0.55 μm, maximum height Ry is 0.10 to 2.50 μm and 10-spot average roughness Rz is 0.05 to 2.50 μm.

In a laminated optical sheet according to an Embodiment, one surface of the adhesive layer A is surface-bonded to one surface of the optical film, and the rough surface which is the other surface of the adhesive layer A is line-bonded and/or point-bonded with a prism ridge line of the condensing film including a prism row forming a laminated integrated optical sheet.

In a laminated optical sheet according to an Embodiment, the bottom surface of the condensing film including the prism row and the adhesive layer A are bonded, and the rough surface of the adhesive layer A and the prism row ridge line of the condensing film with the prism row are line bonded and/or point bonded, to form a laminated integrated optical sheet.

A laminated integrated optical sheet according to an embodiment is a laminated optical sheet including a condensing film composed with a prism row, the film composed with an adhesive layer A, a prism molding layer, a support layer, and a coating layer.

A laminated optical sheet according to an Embodiment includes an adhesive layer A and a condensing film with a ratio of the refractive index $n_1$ and the refractive index $n_2$ of the coating layer of the condensing film composed with the prism row including the prism molding layer expressed by $(n_1/n_2)$ being between 0.8 and 1.2. In this specification, the refractive indices of an adhesive layer and a coating layer refer to refractive indices of an adhesive and a resin that form each layer.

A laminated optical sheet according to an Embodiment is a laminated optical sheet including the adhesive layer A, wherein the adhesive layer A does not contain fine particles.

In a laminated optical sheet according to an Embodiment, a condensing film composed with 2 prism rows integrated via an adhesive layer A is bonded with a peel strength of 0.3 (N/25 mm) to 10 (N/25 mm). When the peel strength is less than 0.3 (N/25 mm), a problem occurs in handling of the laminated optical sheet such as peeling off of the optical film during handling, and when it exceeds 10 (N/25 mm), the luminance is greatly reduced.

In a laminated optical sheet according to an Embodiment, a condensing film composed with prism rows, a reflective film, a diffusion film, a polarizing film, an antireflection film and a transparent protective film are included.

A laminated optical sheet of the present invention is composed with an adhesive layer A, one surface thereof being a smooth surface, the opposite surface being rough with a convex spherical surface shaped by transcription molding, a condensing film D including a prism row to be adhered to the smooth surface of the adhesive layer A, a condensing film E composed with a prism row wherein the ridge line of the prism row being adhered to the rough surface, and an adhesive layer B with both surfaces being smooth, and a diffusion film, and the films mentioned above being stacked in order of a condensing film D, an adhesive layer A, a condensing film E, an adhesive layer B and a diffusion film to be integrated to form a laminated optical sheet.

A laminated optical sheet according to an Embodiment of the present invention is composed with an adhesive layer A, one surface thereof being a smooth surface, the opposite surface being rough with a convex spherical surface shaped by transcription molding, a condensing film D with a prism row to be adhered to the smooth surface of the adhesive layer A, a condensing film E composed with a prism row wherein the ridge line of the prism row being adhered to the rough surface, and an adhesive layer B with both surfaces being smooth and a diffusion film, and the condensing film D and/or condensing film E being composed with a prism mold layer, a supporting layer and a coating layer, and a condensing film D, an adhesive layer A, a condensing film E, an adhesion layer B and a diffusion film are laminated in order to be integrated.

A laminated optical sheet according to an Embodiment, being a diffusion film C having the cross sectional shape thereof having plural convex portions (I) of polygonal cross section or curved cross section arranged in parallel along with random irregularities (II) being lower than the maximum height of the convex portion (I) on the same surface, wherein the condensing film and the diffusion film C are laminated and unified to form a laminated body with the laminated angle between the extending direction of the convex portion (I) and the extending direction of the prism row of the condensing film is in the range from 2° to 88°.

The backlight unit according to the present invention includes, from the bottom, a reflecting plate, a light guide plate, a condensing film composed with a prism row, and a diffusion film C all laminated to become integrated.

A method for producing a laminated optical sheet of the present invention includes a sending out step of feeding a support layer having an easily-adhesive layer on the surface, an application step of applying an ultraviolet ray curable adhesive or an electron beam curable adhesive to the surface of the easily-adhesive layer, a shaping step in which the spherical convex portion is shaped by transfer while irradiating the curable adhesive with ultraviolet rays or electron beams, and an integration step in which the prism row ridge lines of the condensing film prism row is brought into contact with the rough surface of the adhesive under irradiation of the electron beams or ultraviolet beams.

In a method of producing a laminated optical sheet according to an Embodiment, in the coating step, the adhesive is applied using a cylindrical roll made of a blasted metal surface on the surface of the easily adhesive layer of the support layer.

A method for producing a laminated optical sheet in one Embodiment is such that the irradiation amount of ultraviolet rays or electron beams in the shaping step is set at ¹/₂₀₀ to ¹/₂₀ of the sum of the irradiation amount of ultraviolet rays or electron beams in the shaping step and the integration step.

In a laminated optical sheet for achieving the first object of the present invention, a condensing film including two prism rows is laminated and integrated through an adhesive layer, and one surface (interface) of the adhesive layer is formed to be smooth and the other surface is rough.

As shown in FIG. 2, the condensing film composed with prism rows is formed by a prism row including a plurality of unit prisms having a cross section of substantially triangular shape with a vertical angle of approximately 90°.

Furthermore, a condensing film composed with a prism row in which a coating layer is provided on the surface of the support layer facing the prism molding layer can be preferably employed because curling can be reduced.

In a process in which the prism molding layer is molded by ultraviolet or electron beam irradiation, residual stress is generated and tends to shrink, which causes curling. The curling tends to become larger as the resin brightness becomes higher. In order to suppress this curling, a coating layer is provided on the surface of the support layer that faces the prism molding layer. The condensing film can be managed and transported in a roll form.

Adhesive for an adhesive layer and resin for a coat layer in which ratio ($n_1/n_2$) of refractive index $n_1$ of the adhesive layer A to refractive index $n_2$ of the coat layer is 0.8 to 1.2, more preferably 0.9 to 1.1, are selected. When the refractive index ratio ($n_1/n_2$) is less than 0.8 or exceeds 1.2, the condensing performance deteriorates.

The thickness of the coat layer can be determined while adjusting the thickness that can suppress the occurrence of curling. In order to reduce the thickness of the coat layer, a lower viscosity adhesive and a low viscosity resin of less than 40 (mPa·s) can be suitably used.

The smooth surface refers to the surface (interface) of the adhesive layer being solidified by adhesion while having the same interface as the surface of the adherend joined with said surface of the adhesive layer. Or, while having a surface (interface), it refers to the surface (interface) of the adhesion layer having the substantially smooth surface of the solidified adhesion layer of the surface (interface) other than the surface (interface).

More specifically, even when the surface of the adherend is uneven, when the adhesive is applied to said uneven surface and the adhesive is cured and solidified, the surface of the adherend adhering to the surface which is the unevenness of said adherend is quasi face bonded with said uneven surface and the boundary surface (surface) is also called the smooth surface when nearly the same boundary is possessed.

The rough surface refers to an adhesion layer surface whereon a spherical convex portion was formed by transfer on the surface of the adhesive layer except for the adhesive surface bonded to the adherend in a state where the adherend and the adhesive are bonded and solidified.

For the purpose of improving the brightness, a plurality of condensing films composed with prism rows are laminated. The condensing film composed with two stacked prism rows is laminated so that the extending directions of the ridge lines of the prism rows are substantially orthogonal. The pitch of the prism rows of the condensing film composed with two prism rows to be stacked is preferably 0.1 to 10. If it is less than 0.1, the strength as a laminate of two condensing films is insufficient. When it exceeds 10, the thickness as a laminated body will increase and the response/compatibility to thickness reduction is inadequate. More preferably, it is 0.5 to 5.

In a lamination of the condensing film composed with two prism rows, the purpose of making the extension direction of the prism row ridge lines substantially orthogonal is to make the luminance uniform. Here, being substantially orthogonal means a range of 88° to 92°. When a light collecting film composed with a plurality of prism rows is laminated, interference fringes and rainbow-like colors are generated.

The rough surface of the adhesive layer A of the present invention diffuses the incident light and suppresses the generation of interference fringes and rainbow-like colors. And the resin layer containing the transparent bead particles/grains for suppressing generation/occurrence/production of an interference fringes or an rainbow-like colors can be omitted, and thickness reduction and cost reduction can further be achieved.

In order to form a spherical convex portion on one surface of the adhesive layer A, the surface of the adhesive layer is brought into contact with a surface of a metal roll having a finely processed spherical concave portion before the adhesive is solidified and transferred. For the adhesive layer, an ultraviolet ray or electron beam curable adhesive is preferably used.

Further, in order to form the surface of the spherical convex portion and maintain the shape thereof, and develop the adhesive strength (peel strength) with the adherend, irradiation of ultraviolet rays or electron beams is performed step by step.

Furthermore, the surface shape of the spherical convex portion that suppresses the decrease of luminance and suppresses the generation of interference fringes and rainbow-like colors is important. Namely, in the present invention, the adhesive layer A has both functions of an adhesive layer and a diffusion layer. The surface shape of the spherical convex portion can be produced by a blasted metal cylindrical roll.

The backlight unit that achieves the second object of the present invention uses a diffusion film that has high diffusion efficiency and can suppress the occurrence of interference fringes and rainbow-like colors.

The specification of Japanese Patent Application No. 2016-021386 can be used for the diffusion film and the lamination method thereof.

Effects of the Invention

According to a laminated optical sheet and a backlight unit of the present invention, there is the effect of eliminating or reducing the occurrence of interference fringes and rainbow-like colors while maintaining the brightness enhancement effect and higher handling ability.

According to a laminated optical sheet and a backlight unit of the present invention, the manufacturing process can be simplified and the manufacturing efficiency can be improved.

BEST MODE FOR CARRYING OUT THE INVENTION

Embodiments of the present invention will be described in detail below with reference to the drawings. The present invention is not limited to the following embodiments and examples shown in the figures, and the present invention can be variously changed in design.

Figure 1:
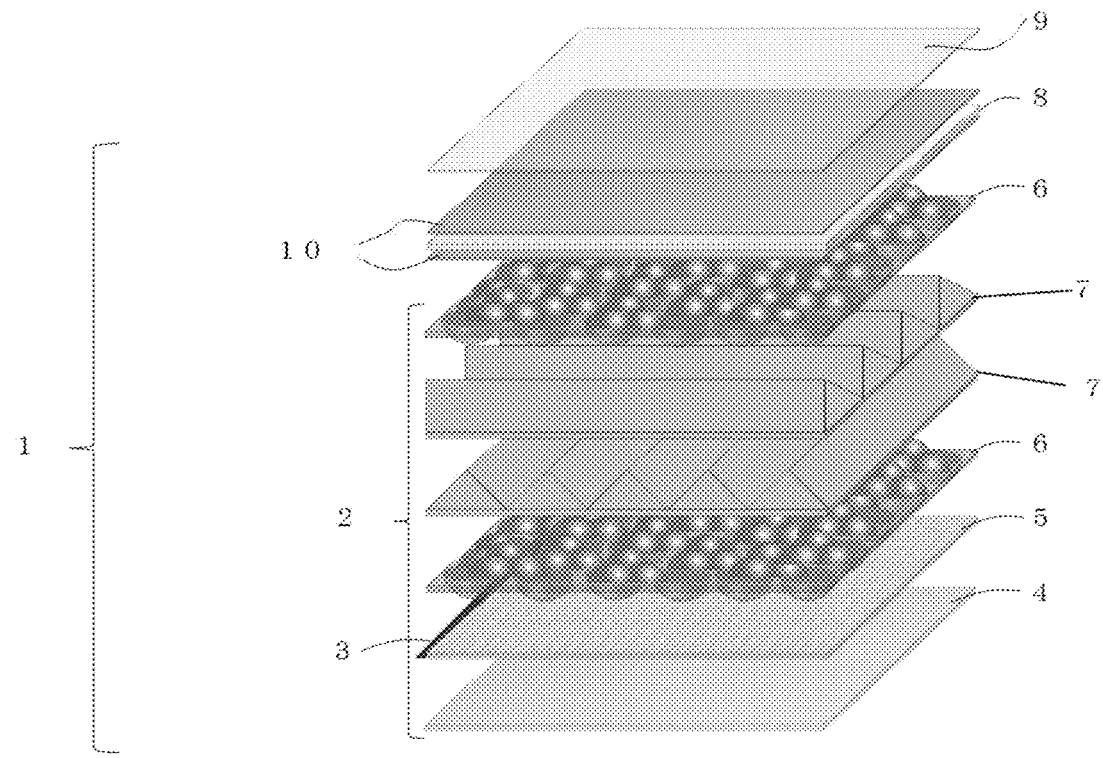
FIG. 1 shows a configuration example of an LCD panel and a backlight unit.
Figure 2:
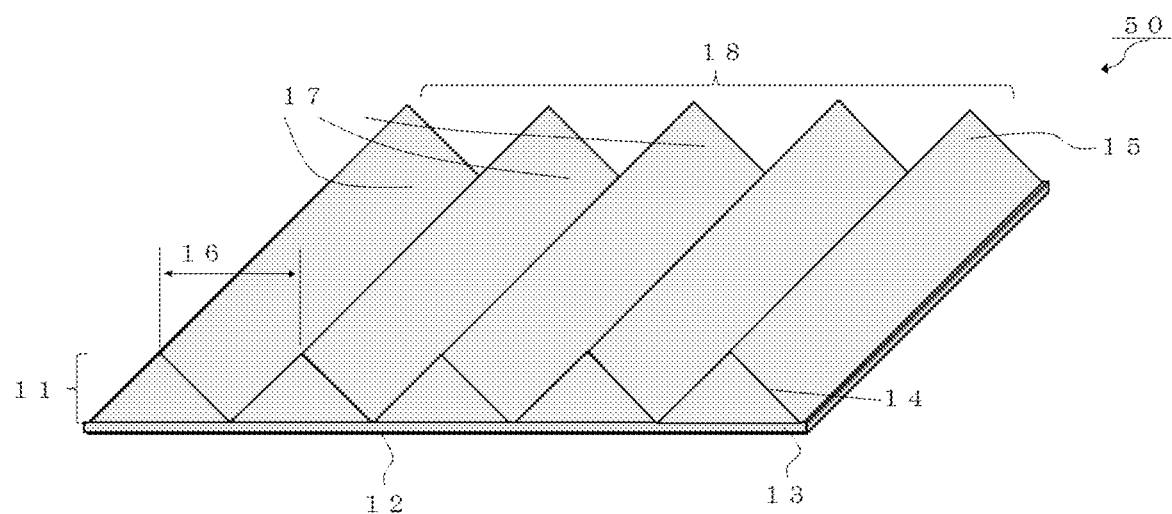
FIG. 2 shows a condensing film composed with prism rows.
Figure 3:
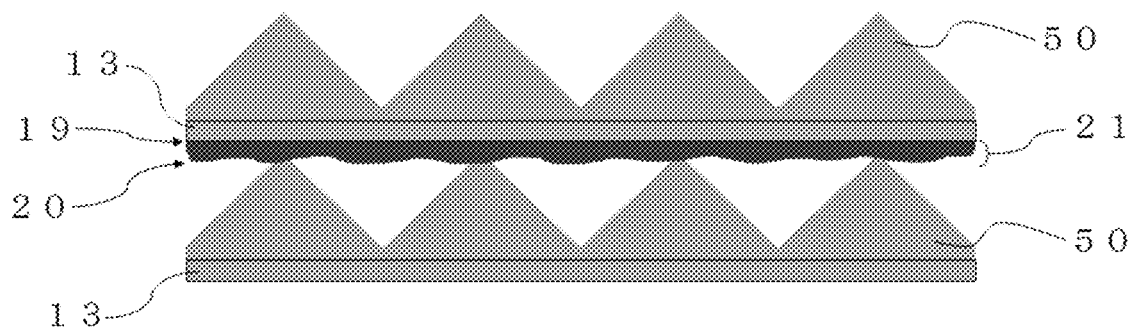
FIG. 3 shows a laminated optical sheet in which a laminated sheet with prism rows and an adhesive layer A are integrated.

FIG. 3 shows a cross-sectional view of a laminated optical sheet in which a condensing film having two prism rows is integrated with an adhesive layer A interposed therebetween. This cross-sectional view depicts a case where the extending directions of the two prism rows are parallel.

One surface of the adhesive layer A21 is bonded to a surface of the support layer 13 of the condensing film 50 composed with a prism row, and a surface of another adhesive layer A is a rough surface 20.

The support layer 13 is a film having an easily-adhesive layer on the surface, such as a PET (polyethylene terephthalate) film, a TAO (cellulose triacetate) film, or a COP (cycloolefin polymer) film. The thickness of the support layer film is 5 to 100 μm, desirably 10 to 80 μm. If the thickness exceeds 100 μm, the demand for thinning cannot be satisfied. If the thickness is less than 5 μm, wrinkles are prominent, and it becomes difficult to form a prism row on the support layer and to form the rough surface of the adhesive layer A.

The molding of the condensing film 50 composed with the prism rows can be accomplished by pouring the ultraviolet ray or electron beam curing resin between the roll-like die cut and processing into a shape, a reverse shape of the prism row, (the same shape but the unevenness is reversed) and the film of the support layer 13, and by irradiating with an ultraviolet ray or electron beam, the ultraviolet or electron beam curable resin is cured.

As the ultraviolet ray or electron beam curable resin, an acrylic ultraviolet ray or electron beam curable resin is preferably used, and more preferably a solventless acrylic ultraviolet ray or electron beam curable resin can be used. The solventless type is preferable because it is excellent in handling ability and low shrinkage.

Examples of radical polymerization monomers or oligomers of acrylic ultraviolet or electron beam curable resins include urethane poly (meth) acrylate, polyester (meth) acrylate, and epoxy poly (meth) acrylate. These may be used alone or in a form of a mixture of two or more monomers.

A carbonyl compound such as benzyl, acetoin or benzophenone can be used as a photo-polymerization initiator. These may contain additives, such as antioxidant and a yellowing prevention agent, as needed.

From the viewpoint of luminance improvement, acrylic ultraviolet light or electron beam curable resins mixed with $ZrO_2$, $TiO_2$, etc., which are transparent and high refractive index inorganic fine particles, can be suitably used in the visible light region.

The prism row is preferably composed with unit prisms having a triangular cross-sectional shape with an apex angle of 85° to 95°, more preferably 88° to 92°, from the viewpoint of improving luminance.

Figure 4:
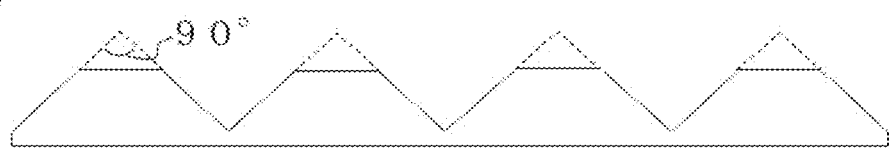
FIG. 4 shows a specific example of the cross-sectional shape of the prism row.
Figure 4:

Further, as shown in FIG. 4, the cross-sectional shape in the vicinity of the top of the unit prism may be semicircular, trapezoidal, or a protrusion on the top of the unit prism. That is, as shown in FIG. 4(2), the semicircular shape is effective in suppressing the generation of white spots, which are optical defects due to scratches, and as shown in FIG. 4(1), the peel strength is improved when trapezoidal or protrusion shapes are present.

The pitch of the prism row is appropriately designed depending on the liquid crystal cell size and so on, but the shorter the pitch is, the lower the prism row height can be designed, which enables the reduction of the thickness of the laminated optical sheet, and also the backlight unit, enabling one to make the backlight unit thinner. The pitch is 5 to 100 μm, more preferably 10 to 60 μm. If the pitch is less than 10 μm, it is difficult to cut the transfer roll mold, and if it exceeds 100 μm, the demand for thinning cannot be met.

As the resin of the adhesive layer A, an ultraviolet ray or electron beam curable acrylic resin adhesive or an acrylic resin pressure-sensitive resin adhesive can be suitably used.

As long as the adhesive (including pressure-sensitive adhesive) is an ultraviolet or electron beam curable type and adheres to an acrylic resin or polyethylene terephthalate resin, the adhesive can be used.

An adhesive including a mixture of a poly-functional epoxy (meth) acrylate oligomer, a poly-functional urethane (meth) acrylate, a (meth) acryl monomer, a (meth) acrylate compound having an acryloyl group, and a photo-polymerization initiator can be used.

The viscosity of the adhesive is from 5 to 800 (25° C., mPa·s), preferably from 10 to 500 (25° C., mPa·s). If it is less than 5 (25° C., mPa·s), the productivity is remarkably lowered, and if it exceeds 800 (25° C., mPa·s), it becomes difficult to control the thickness of the adhesive layer.

The thickness of the adhesive layer is from 1 to 50 μm, preferably from 3 to 30 μm. If the thickness of the adhesive layer is less than 1 μm, the peel strength that can be used as a laminate cannot be achieved, and if it exceeds 50 μm, the requirement for thinning is not satisfied.

When the peel strength is less than 0.3 (N/25 mm), problems arise in handling properties such as peeling of the optical film during handling. When it exceeds 10 (N/25 mm), the drop in luminance expands.

The Ra, Ry, and Rz of the surface of the solidified adhesive layer A having a spherical convex portion have Ra of 0.01 to 0.55 μm, Ry of 0.10 to 2.50 μm, and Rz of 0.05 to 2.50 μm.

When any of Ra, Ry, and Rz is out of the above range, interference fringes and rainbow-like colors become conspicuous and the product is not practical.

For example, the surface having the spherical convex portion can be shaped by transfer from a roll surface of a cylindrical metal having a concave portion formed by sandblasting. Specifically, a spherical recess can be formed by striking substantially spherical blast particles whose surface randomly includes a particle size in the range of 30 to 100 μm on a metal roll.

Incidentally, for the production of the cylindrical metal roll, the specification of JP 2011-221197 A can be used.

The surface having the spherical convex portion of the adhesive layer A can be exposed by peeling off the two optical films integrated through the adhesive layer A. Ra, Ry, and Rz can be calculated from the rough surface of the adhesive layer A that appears. This can be obtained by numerical analysis of a rough surface obtained by observation with a laser microscope. The adhesive layer A can contain fine particles for adjusting the refractive index, such as $ZrO_2$, within a range that satisfies the above Ra, Ry, and Rz.

It is desirable that the adhesive layer A has a configuration which does not contain fine particles. This is because the formation of the surface having the target spherical convex portion, the improvement of the peel strength, and further the cost reduction, that are hindered.

Here, the term "fine particles" refers to particles having a particle size of micron made of an inorganic or organic material.

The diffusion film is obtained by kneading fine particles in an ultraviolet ray or electron beam curable resin, and applying and curing on a base film.

As the fine particles, inorganic particles such as glass beads and silica can be suitably used.

A diffusion film C that can be suitably used in the present invention is a diffusion sheet disclosed in an international pamphlet (WO2016/088385).

Figure 6:
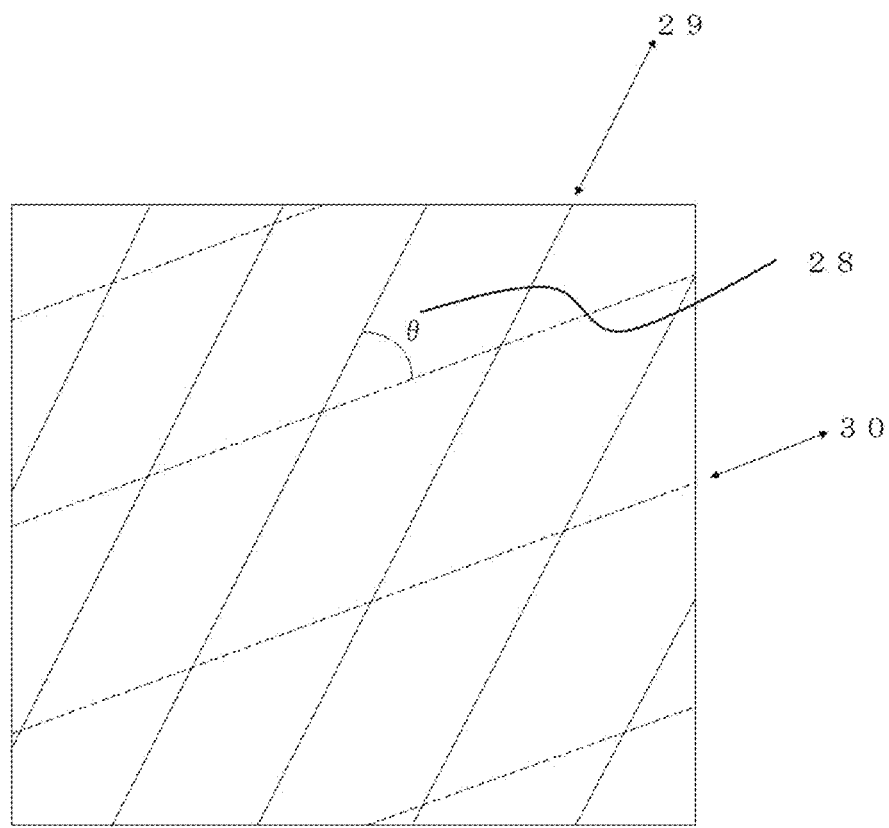
FIG. 6 shows an illustration of the crossing angle.

As shown in FIG. 6, the bottom surface of the condensing film composed with the prism rows and the diffusion film C are integrated with each other by adhesion so that the extending direction 29 of the prism row ridge line of the condensing film and the extending direction 30 of the convex portion (I) form an angle in the range of 2° to 88° and both surfaces of the adhesive layer are bonded as smooth surfaces.

The crossing angle 28 (θ) can be determined by assembling an LCD panel including a laminated optical sheet disclosed in the present invention without bonding and solidifying the bottom surface of the condensing film composed with the prism rows and by obtaining a crossing angle at which interference fringes and rainbow-like colors do not occur while changing the extending direction 30 of the diffusion film C.

Also, the crossing angle can be determined by the method disclosed in Japanese Patent Application No. 2016-021386.

One example of a method for producing a laminated optical sheet of the present invention will be described.

Figure 7:
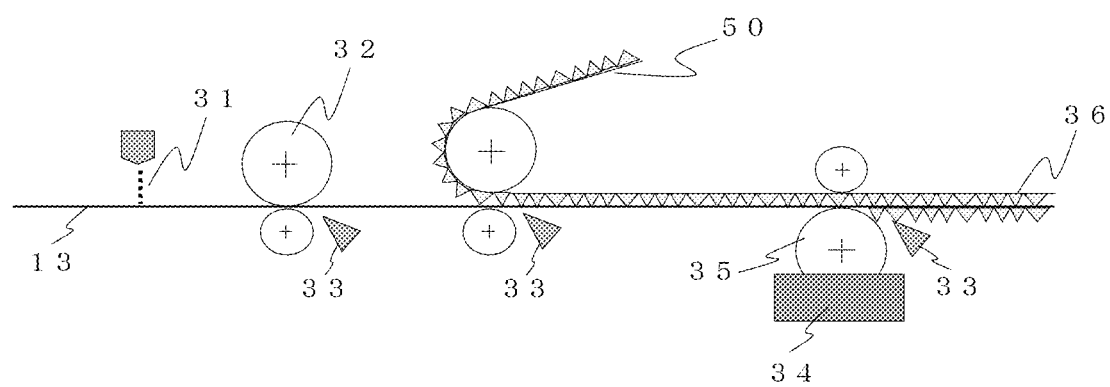
FIG. 7 shows a schematic diagram of the manufacturing process.

As shown in FIG. 7, an ultraviolet curable adhesive 31 is applied on the support layer 13, and the surface of the metal mold cylindrical roll 32 formed with a spherical recess on the surface is brought into contact with the surface of the adhesive 31 while the first UV irradiation is performed by the UV irradiation device 33, and the spherical convex portion is shaped by transfer and, after that, The prism row ridge line of the condensing film 50 formed of the prism row is brought into contact with the spherical convex portion surface of the adhesive layer. The first ultraviolet irradiation is performed by the ultraviolet irradiation device 33, and the spherical convex portion is shaped by transfer, and then the prism row ridge line of the condensing film 50 formed of the prism row is brought into contact with the spherical convex portion surface of the adhesive layer. The laminated optical sheet F is obtained by UV irradiation for a second time while solidifying and integrating the adhesive layer.

The first ultraviolet light amount is from $1/200$ to $1/20$ of the total amount of ultraviolet light calculated by adding the amount for the first time and the amount for the second time, and more preferably $1/150$ to $1/10$. When the amount of ultraviolet light is less than $1/200$, the shape of the spherical convex portion formed on the surface of the adhesive layer A is not maintained, and the generation of interference fringes and rainbow-like colors cannot be suppressed. If the amount of ultraviolet light exceeds $1/20$ of the total amount of ultraviolet light, the predetermined peel strength cannot be obtained.

Subsequently, while the support layer of the laminated optical sheet F integrated with the adhesive layer is in contact with the metal cylindrical mold roll 35 shaped in the same shape as the prism row, the ultraviolet irradiation device 33 is used. The laminated optical sheet G in which the prism molding layer was integrated was obtained by irradiating ultraviolet rays for solidifying the resin. The mold roll 35 is partially immersed in the ultraviolet curable resin tank 34 and plays a role of applying resin to the lower surface of the support layer of the laminated optical sheet F.

Subsequently, in the same manner, an adhesive is applied on the bottom surface 36 of the laminated optical sheet 5, and the laminated optical sheet H is solidified and integrated by irradiation with ultraviolet rays while the convex portion (I) of the diffusion film C is in contact with the adhesive. (Not shown).

Similarly, the diffusion film C is obtained by applying ultraviolet curable resin on the support layer and by irradiating ultraviolet rays using an ultraviolet irradiation device (not shown) to be solidified, while the ultraviolet curable resin is being pressed to a metal cylindrical mold roll (not shown), a reverse shape of the same shape as the surface shape of the diffusion film being pressed thereon.

Figure 5:
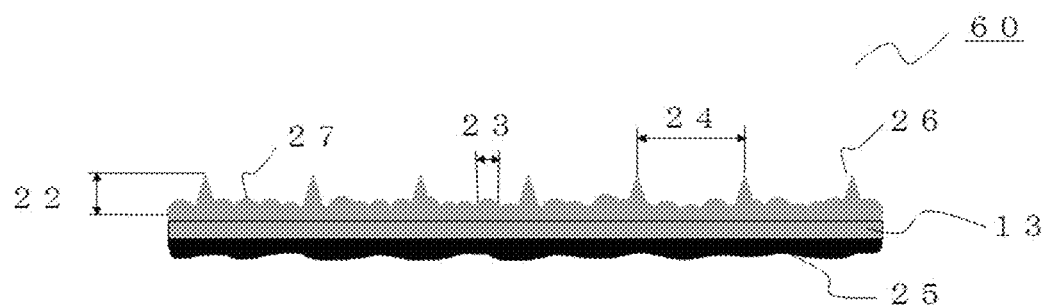
FIG. 5 shows an example of a cross-sectional view of the diffusion film C.

FIG. 5 shows an example of a cross-sectional view of the diffusion film C. As shown in FIG. 5, the diffusion film C60 has a configuration in which a triangular convex portion (I) 26 and a spherical convex portion (II) 27 are provided on the surface of the support layer 13. On the back surface of the diffusion film C60, a resin layer 25 composed with unevenness is provided. As shown in FIG. 5, a resin layer having irregularities on one surface of the diffusion film C60 can be similarly molded by transfer and added.

The laminated optical sheets F, G, and H disclosed in the present invention can be used as constituent members of the backlight unit.

A measurement method and an evaluation method are described together below.

1. Peel Strength Test

Edges to be clamped by a chuck of a tensile tester for slowly peeling off two optical films at the surface where the rough surface of the adhesive layer A adhering to the optical film and the prism row ridge line of The condensing film composed with the prism row are obtained. The maximum peel strength was measured by conducting a 180° tensile strength test at the tensile speed of 300 mm/min, with a piece width of 25 mm and a test length of 100 mm.

The peel strength defined in the present invention refers to the maximum value obtained by preparing a predetermined test piece in the longitudinal direction and the transverse direction of the optical film and performing a peel strength test.

2. Viscosity of the Adhesive Material

Measured with a B-type viscometer at 25° C.

3. Ra, Ry, Rz of Rough Surface of Adhesive Layer A

The two optical films were slowly peeled off at the surface where the rough surface of the adhesive layer A adhering to the optical film and the surface where the prism row ridge line of the condensing film composed with the prism row are adhered. The rough surface of the adhesive layer A that has appeared after being peeled off was photographed at a magnification of 2000 using a VK8710 manufactured by Keyence (registered trademark), and was measured. with an analysis software (K Analyzer) in accordance with JIS standards (JIS B0601: 1994). However, the part that had been joined to The rough surface of the adhesive layer A was excluded. For example, the prism row ridge line trace was excluded from the measurement part. In addition, the bonding state was observed at an imaging magnification of 400 times.

4. UV Intensity

The illuminance was measured with MV-03A manufactured by Oak Manufacturing Co., Ltd. (registered trademark)

5. Evaluation of Interference Fringe and Rainbow-Like Colors

A backlight unit used in the LCD panel of a notebook PC (X554L) manufactured by ASUS (registered trademark) was used. The laminated optical sheet was placed on the backlight and visually observed. to see whether or not interference fringes and rainbow-like colors were generated.

6. Curl

A sheet cut into a 10 cm square was placed on a surface plate, the height of the sheet raised from the surface plate to the four corners was measured with a gap Gauge, and the maximum value was defined as curl.

7. Refractive Index

The refractive index of the coating layer and the adhesive layer was measured with a NPR30V/type A manufactured by SHIMADZU.

Embodiment 1

An acrylic adhesive having a viscosity of 40 (mPa·s) was applied with a thickness of 10 μm on a support layer made of a 25 μm polyethylene terephthalate film coated with an easily-adhesive layer on both sides.

Subsequently, an ultraviolet ray of 0.19 mW/cm² at a line speed of 8 m/min is radiated while bringing a metal roll including a copper surface blasted with a mixture of substantially spherical alumina particles having a particle diameter of 30 to 60 μm in contact with acrylic adhesive to a form spherical convex portion on the surface of the adhesive layer. The adhesive layer was not sufficiently solidified and had tackiness.

Subsequently, the support layer, the adhesive layer, and the prism were irradiated with 20 mW/cm² of ultraviolet rays at a line speed of 8 m/min while bringing the prism ridge of the condensing film made of the prism row into contact with the spherical convex surface of the adhesive layer. After integrating the condensing film having the support layer, the adhesive layer and the prism rows, while pouring an ultraviolet curable acrylic resin with a viscosity of 1200 (mPa·s) between the surface without the adhesive of supporting layer opposite the spherical convex surface of the adhesive layer and the metal roll including a copper surface with the prism row of the same shape formed whereon, and solidifying by irradiation of ultraviolet light at the line speed of 8 m/min and 10 mW/cm² and an unified optical laminated sheet Y including prism molding layer (I), supporting layer, adhesion layer and prism molding layer (II) was obtained.

In the laminated optical sheet Y, the extending directions of the prism row ridge lines of the two prism molding layers are substantially orthogonal. The cross-sectional shape of the prism molding layer (I) was a triangular shape with an apex angle of approximately 90°, and the pitch was 25 μm. The cross-sectional shape of the prism molding layer (II) was a triangular shape with an apex angle of approximately 90°, and the pitch was 50 μm. The peel strength of the laminated optical sheet Y was 0.6 (N/25 mm). Ra was 0.11 μm, Ry was 0.54 μm, and Rz was 0.70 μm. As a result of observing the joining situation, the prism ridge line was adhered linearly. Generation of interference fringes and rainbow-like colors was not observed.

Embodiment 2

An acrylic adhesive having a viscosity of 30 (mPa·s) was applied with a thickness of 2 μm on a support layer made of a μm polyethylene terephthalate film coated with an easily-adhesive layer on both sides, and the ultraviolet light of 20 mW/cm² was irradiated at the line speed of 2 m/min. The adhesive solidified and formed a coat layer without tackiness.

Subsequently, an ultraviolet curable acrylic resin having a viscosity of 1200 (mPa·s) was poured into the gap between the opposing surfaces of the coating layer and a metal roll including a copper surface on which a prism row having the same shape in opposite direction to the prism row was formed, to be cured by ultraviolet rays irradiation at 10 mW/cm² at a line speed of 8 m/min to become solidified, and the laminate Z of the prism molding layer (I), the support layer, and the coating layer were wound into a roll.

Subsequently, while feeding out the laminate Z, an acrylic adhesive having a viscosity of 40 (mPa·s) was applied to the surface of the coat layer with a thickness of 10 μm, and while the acrylic adhesive and the metal roll including a nickel surface processed with a blast treatment by a mixture of almost spherical alumina particles with particle sizes from 30 μm to 60 μm were in contact, an ultraviolet ray of 19 mW/cm² was irradiated at a line speed of 8 m/min to shape a spherical convex portion at the surface of the adhesive layer. The adhesive layer was not sufficiently solidified and had a viscosity.

Subsequently, an ultraviolet curable acrylic resin having a viscosity of 1200 (mPa·s) was poured into the gap between the opposing surfaces of the coating layer and a metal roll including a copper surface on which a prism row having the same shape in opposite direction to the prism row was formed, to be cured by ultraviolet rays irradiation at 10 mW/cm² under a line speed of 8 m/min to become solidified, and a unified optical laminate sheet $Y_2$ including the prism molding layer (I), the support layer, the adhesive solidified layer, the adhesive layer and the prism molding layer (II) and the supporting layer.

In the laminated optical sheet $Y_2$, the rolling directions of the prism row ridge lines of the two prism molding layers were substantially orthogonal. The cross-sectional shape of the prism molding layer (I) was a triangular shape with an apex angle of approximately 90°, and the pitch was 25 μm. The cross-sectional shape of the prism molding layer (II) was a triangular shape with an apex angle of approximately 90°, and the pitch was 50 μm. The peel strength of the laminated optical sheet $Y_2$ was 0.6 (N/25 mm). Ra was 0.11 µm, Ry was 0.54 µm, and Rz was 0.70 µm. Generation of interference fringes and rainbow-like colors was not observed. As a result of investigating the curl of the laminate Z after storing the laminate Z wound 1000 times in a roll shape in an environment of 30° C.×1 for a month, the curl was 0.1 mm or less. The refractive index ratio between the coat layer and the adhesive layer was 1.00.

Embodiment 3

The adhesive used in Embodiment 1 was applied to a thickness of 30 µm on the support layer of the condensing film with the prism rows of the optical laminated sheet Y obtained in an embodiment. A plurality of convex portions (I) having a triangular cross-sectional shape were arranged side by side in parallel, while having the peak portion of the convex portion of the diffusion film having the surface on the same plane contact with a triangular convex portion (I) with the height of the convex portion (I) 22 being 20 µm, the interval 24 of the height of the convex portion (I) being 300 µm, and the spherical convex portion (II) with the maximum height of the spherical convex portion (II) being 20 µm, the width 23 being in the range of from 0.5 µm to 10.0 µm the laminated optical sheet integrated by solidifying by irradiating a UV light of 20 mW/cm² at the line velocity of 8 m/min (Refer to FIG. 5). The intersection angle was 7° (Refer to FIG. 6). Interference fringes and rainbow-like colors were not observed.

INDUSTRIAL APPLICABILITY

The present invention is useful for optical films used in liquid crystal panels and the like.

DESCRIPTION OF SYMBOLS

1 Configuration example of LCD panel
2 Configuration example of backlight unit
3 LED
4 Reflection plate
5 Light guide plate
6 Diffusion film
7 Light collection film
8 Liquid crystal cell
9 Antireflection film
10 Polarizing film
11 Molding layer
12 Bottom surface
13 Supporting layer
14 Vertical angle
15 Prism row ridgeline
16 Pitch
17 Unit prism
18 Prism row
19 Smooth surface
20 Rough surface
21 Adhesive layer A
22 Maximum height
23 Width
24 Interval of convex portion (I)
25 Resin layer composed with unevenness
26 Convex portion (I)
27 Convex portion (II)
28 Crossing angle
29 Extending direction of prism row ridgeline
30 Extending direction of convex portion (I) ridgeline of diffusion film C
31 Adhesive
32 Metal mold cylindrical roll formed with spherical recess on surface
33 Ultraviolet irradiation device
34 Ultraviolet curable resin tank
35 Metal cylindrical mold roll shaped in same shape as prism row
36 Bottom surface of laminated optical sheet
50 Condensing film formed with prism row
60 Diffusion film C

What is claimed is:

1. A laminated optical sheet comprising:
    an adhesive layer A, one surface thereof being a smooth surface, the opposite surface being rough and having a plurality of convex spherical surfaces shaped by transcription molding;
    a condensing film D having a plurality of prism rows adhered to the smooth surface of the adhesive layer A;
    a condensing film E having a plurality of prism rows wherein ridge lines of the prism rows are adhered to the rough surface;
    an adhesive layer B with both surfaces being smooth; and
    a diffusion film C having a cross sectional shape which includes plural convex portions (I) of polygonal cross section or curved cross section arranged in parallel along with random irregularities (II) lower than a maximum height of the convex portion (I) on the same surface; and
    wherein the films are stacked in an order with condensing film D, adhesive layer A, condensing film E, adhesive layer B, and diffusion film C, integrated to form the laminated optical sheet, and
    wherein the condensing film D and the diffusion film C are laminated and unified to form a laminated body with an angle between an extending direction of the convex portion (I) and an extending direction of the prism rows of at least one of the condensing films being in the range from 2° to 88°.

2. The laminated optical sheet according to claim 1, wherein at least one of the following occurs:
    the condensing film D comprises a prism molding layer, a supporting layer, and a coating layer; or
    the condensing film E comprises a prism molding layer, a supporting layer, and a coating layer.

3. The laminated optical sheet according to claim 2, wherein the laminated optical sheet is combined with a reflecting plate and a light guide plate in a backlight unit.

4. The laminated optical sheet according to claim 2 in combination with a reflecting plate and a light guide plate, wherein the reflecting plate, the light guide plate, and the laminated optical sheet are laminated in this order in a backlight unit.

5. The laminated optical sheet according to claim 1, wherein the laminated optical sheet is combined with a reflecting plate and a light guide plate in a backlight unit.

6. The laminated optical sheet according to claim 1 in combination with a reflecting plate and a light guide plate, wherein the reflecting plate, the light guide plate, and the laminated optical sheet are laminated in this order in a backlight unit.

* * * * *